United States Patent
Chan

(10) Patent No.: US 11,336,191 B1
(45) Date of Patent: May 17, 2022

(54) POWER SUPPLY DEVICE WITH LOW LOSS

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/249,669

(22) Filed: Mar. 9, 2021

(30) Foreign Application Priority Data

Nov. 27, 2020 (TW) .................................. 109141752

(51) Int. Cl.
*H02M 3/335* (2006.01)
*H02M 1/088* (2006.01)
*H02M 1/00* (2006.01)

(52) U.S. Cl.
CPC ....... *H02M 3/33576* (2013.01); *H02M 1/088* (2013.01); *H02M 3/33569* (2013.01); *H02M 3/33592* (2013.01); *H02M 1/0009* (2021.05); *H02M 1/0048* (2021.05); *H02M 1/0054* (2021.05)

(58) Field of Classification Search
CPC ............. H02M 3/33576; H02M 1/088; H02M 3/33569; H02M 3/33592; H02M 1/0009; H02M 1/0048; H02M 1/0054
See application file for complete search history.

(56) References Cited

U.S. PATENT DOCUMENTS 5,636,116 A * 6/1997 Milavec ............ H02M 3/33592
363/89
7,495,934 B2 * 2/2009 Chen ................. H02M 3/33592
363/21.06

(Continued)

FOREIGN PATENT DOCUMENTS

CN 103427649 A 12/2013
CN 111865091 A 10/2020

(Continued)

OTHER PUBLICATIONS

European Search Report dated Aug. 20, 2021, issued in application No. EP 21161339.3.

(Continued)

*Primary Examiner* — Yusef A Ahmed
(74) *Attorney, Agent, or Firm* — McClure, Qualey & Rodack, LLP

(57) ABSTRACT

A power supply device with low loss includes an input switch circuit, a transformer, a first capacitor, an output stage circuit, and a detection and control circuit. The input switch circuit generates a switching voltage according to an input voltage. The output stage circuit generates an output voltage. The output stage circuit includes a first rectifying switch element and a second rectifying switch element. The detection and control circuit detects a first output current flowing through the first rectifying switch element so as to generate a first control voltage, and it detects a second output current flowing through the second rectifying switch element so as to generate a second control voltage. The first rectifying switch element is selectively closed or opened according to the first control voltage. The second rectifying switch element is selectively closed or opened according to the second control voltage.

13 Claims, 3 Drawing Sheets

(56) References Cited

U.S. PATENT DOCUMENTS

| | | | | |
|---|---|---|---|---|
| 7,567,443 B2* | 7/2009 | Shiga | .................. | H02M 3/3376 |
| | | | | 363/17 |
| 9,071,155 B2* | 6/2015 | Uno | .................. | H02M 3/33561 |
| 10,051,696 B2* | 8/2018 | Wu | ..................... | H05B 45/382 |
| 10,381,914 B2* | 8/2019 | Chen | ..................... | H02M 1/083 |
| 10,554,136 B1* | 2/2020 | Miletic | .................. | H02M 1/38 |
| 10,581,319 B1 | 3/2020 | Lin et al. | | |
| 10,790,752 B1* | 9/2020 | Chan | ..................... | H02H 3/243 |
| 2001/0030879 A1* | 10/2001 | Greenfeld | ............. | H02M 3/285 |
| | | | | 363/17 |
| 2002/0191422 A1* | 12/2002 | Takagi | ............... | H02M 3/33592 |
| | | | | 363/21.06 |
| 2007/0263421 A1* | 11/2007 | Kyono | .............. | H02M 3/33592 |
| | | | | 363/127 |
| 2009/0097280 A1* | 4/2009 | Wu | ..................... | H02M 3/3378 |
| | | | | 363/17 |
| 2009/0244934 A1* | 10/2009 | Wang | ................. | H02M 3/33592 |
| | | | | 363/21.06 |
| 2010/0103710 A1* | 4/2010 | Reddy | ............... | H02M 3/33592 |
| | | | | 363/127 |
| 2010/0290256 A1* | 11/2010 | Zhou | ................. | H02M 3/33592 |
| | | | | 363/21.02 |
| 2012/0033453 A1* | 2/2012 | Gong | ...................... | H02M 3/01 |
| | | | | 363/21.02 |
| 2012/0063175 A1* | 3/2012 | Wang | ................. | H02M 3/33592 |
| | | | | 363/21.14 |
| 2012/0081927 A1* | 4/2012 | Matsumoto | ....... | H02M 3/33523 |
| | | | | 363/21.05 |
| 2015/0109824 A1* | 4/2015 | Chen | ..................... | H02M 3/22 |
| | | | | 363/17 |
| 2018/0262116 A1* | 9/2018 | Ouyang | ............ | H02M 3/33592 |
| 2019/0267906 A1* | 8/2019 | Zhang | .................. | H02M 1/083 |
| 2020/0137862 A1 | 4/2020 | Kawaguchi et al. | | |
| 2020/0195160 A1* | 6/2020 | Mayell | .............. | H02M 3/33523 |
| 2020/0336071 A1* | 10/2020 | Iorio | ..................... | H02M 1/088 |
| 2020/0336076 A1* | 10/2020 | Qian | ................. | H02M 3/33584 |
| 2021/0313823 A1* | 10/2021 | Chan | ........................ | H02J 7/06 |
| 2022/0006377 A1* | 1/2022 | Chan | ..................... | H02M 1/44 |

FOREIGN PATENT DOCUMENTS

| | | |
|---|---|---|
| TW | I705652 B | 9/2020 |
| TW | 202037062 A | 10/2020 |

OTHER PUBLICATIONS

Chinese language office action dated Jun. 4, 2021, issued in application No. TW 109141752.

* cited by examiner

POWER SUPPLY DEVICE WITH LOW LOSS

CROSS REFERENCE TO RELATED APPLICATIONS

This Application claims priority of Taiwan Patent Application No. 109141752 filed on Nov. 27, 2020, the entirety of which is incorporated by reference herein.

BACKGROUND OF THE INVENTION

Field of the Invention

The disclosure generally relates to a power supply device, and more specifically, to a power supply device with low loss.

Description of the Related Art

In conventional power supply devices, when an output diode switches from a turned-on state into a turned-off state, an output current flowing through the output diode may not be reduced to 0. This non-ideal characteristic tends to increase the switching loss of the power supply device, thereby reducing the overall efficiency of the power supply device. Accordingly, there is a need to propose a novel solution for solving this problem of the prior art.

BRIEF SUMMARY OF THE INVENTION

In a preferred embodiment, the invention is directed to a low-loss power supply device that includes an input switch circuit, a transformer, a first capacitor, an output stage circuit, and a detection and control circuit. The input switch circuit generates a switching voltage according to an input voltage. The transformer includes a main coil, a first secondary coil, and a second secondary coil. A leakage inductor and a magnetizing inductor are built in the transformer. The main coil receives the switching voltage through the leakage inductor. The magnetizing inductor is coupled through the first capacitor to a ground. The output stage circuit is coupled to the first secondary coil and the second secondary coil, and is configured to generate an output voltage. The output stage circuit includes a first rectifying switch element and a second rectifying switch element. The detection and control circuit is coupled to the output stage circuit. The detection and control circuit detects a first output current flowing through the first rectifying switch element so as to generate a first control voltage, and it detects a second output current flowing through the second rectifying switch element so as to generate a second control voltage. The first rectifying switch element is selectively closed or opened according to the first control voltage. The second rectifying switch element is selectively closed or opened according to the second control voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
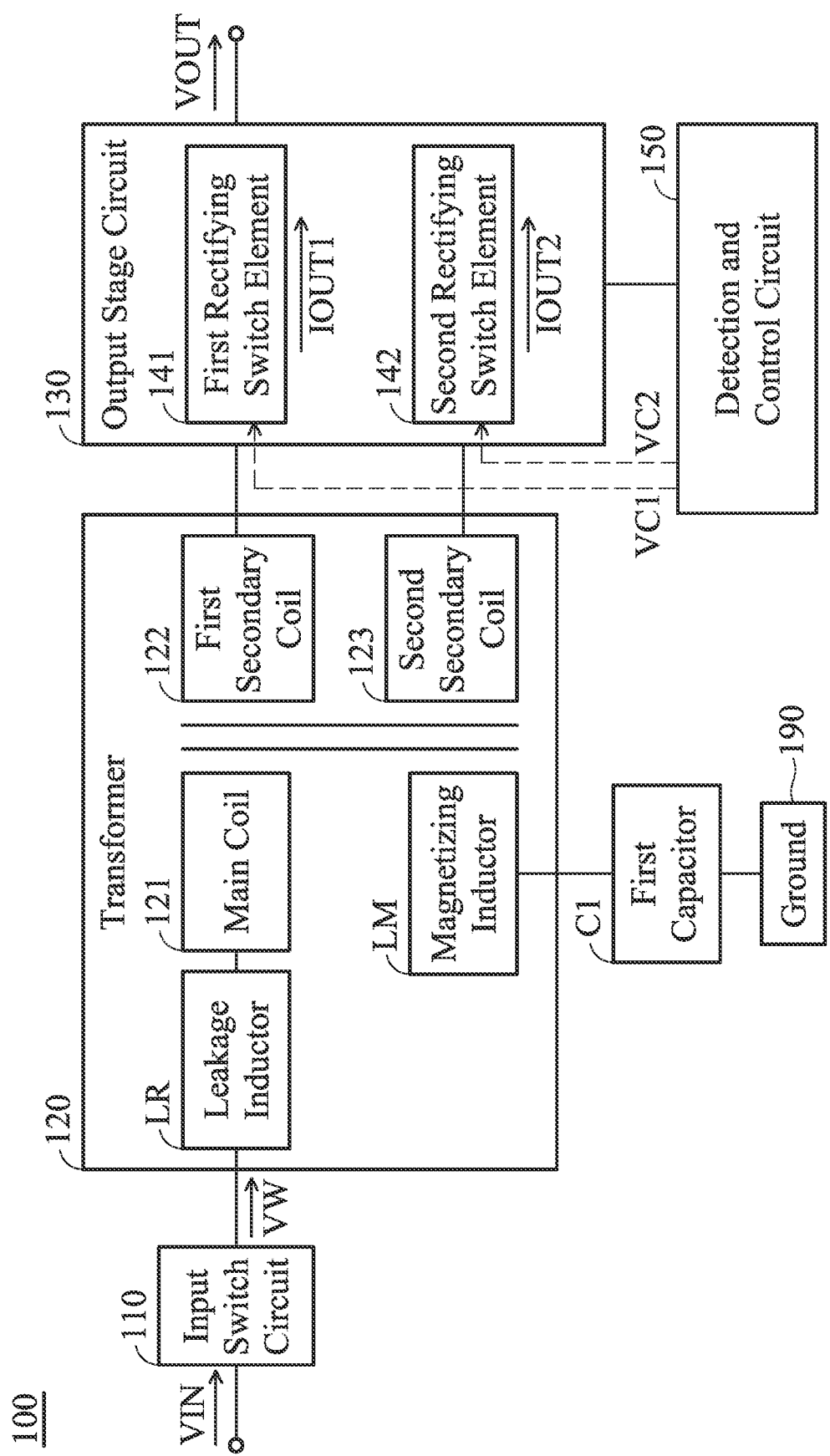
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes an input switch circuit 110, a transformer 120, a first capacitor C1, an output stage circuit 130, and a detection and control circuit 150. It should be noted that the power supply device 100 may further include other components, such as a voltage regulator and/or a negative feedback circuit, although they are not displayed in FIG. 1.

The input switch circuit 110 generates a switching voltage VW according to an input voltage VIN. The input voltage VIN may be from an external input power source. The input voltage VIN may be a DC (Direct Current) voltage with any voltage level. For example, the voltage level of the DC voltage may be from 380V to 400V, but it is not limited thereto. The transformer 120 includes a main coil 121, a first secondary coil 122, and a second secondary coil 123. A leakage inductor LR and a magnetizing inductor LM are built in the transformer 120. The main coil 121, the leakage inductor LR, and the magnetizing inductor LM may be positioned at the same side of the transformer 120. The first secondary coil 122 and the second secondary coil 123 may be positioned at the opposite side of the transformer 120. The main coil 121 receives the switching voltage VW through the leakage inductor LR. The first secondary coil 122 and the second secondary coil 123 can be operated according to the switching voltage VW. The magnetizing inductor LM is coupled through the first capacitor C1 to a ground 190. The ground 190 may mean the earth or any grounding path coupled to the earth, and it is not an internal component of the power supply device 100. The output stage circuit 130 is coupled to the first secondary coil 122 and the second secondary coil 123, and is configured to generate an output voltage VOUT. For example, the output voltage VOUT may be another DC voltage, whose voltage level may be from 18V to 20V, but it is not limited thereto. The output stage circuit 130 includes a first rectifying switch element 141 and a second rectifying switch element 142. The detection and control circuit 150 is coupled to the output stage circuit 130. The detection and control circuit 150 can detect a first output current IOUT1 flowing through the first rectifying switch element 141 so as to generate a first control voltage VC1, and can also detect a second output current IOUT2 flowing through the second rectifying switch element 142 so as to generate a second control voltage VC2. Next, the first rectifying switch element 141 and the second rectifying switch element 142 are controlled by the detection and control circuit 150. The first rectifying switch element 141 is selectively closed or opened according to the first control voltage VC1. For example, if the first control voltage VC1 has a high logic level, the first rectifying switch element 141 may be closed (i.e., the first rectifying switch element 141 is considered as a short-circuited path), and if the first control voltage VC1 has a low logic level, the first rectifying switch element 141 may be opened (i.e., the first rectifying switch element 141 is considered as an open-circuited path). The second rectifying switch element 142 is selectively closed or opened according to the second control voltage VC2. For example, if the second control voltage VC2 has a high logic level, the second rectifying switch element 142 may be closed (i.e., the second rectifying switch element 142 is considered as a short-circuited path), and if the second control voltage VC2 has a low logic level, the second rectifying switch element 142 may be opened (i.e., the second rectifying switch element 142 is considered as an open-circuited path). In some embodiments, when the first output current IOUT1 is exactly equal to 0, the first rectifying switch element 141 can be opened; otherwise, the first rectifying switch element 141 can be closed. On the other hand, when the second output current IOUT2 is exactly equal to 0, the second rectifying switch element 142 can be opened; otherwise, the second rectifying switch element 142 can be closed. With such a design, the first rectifying switch element 141 and the second rectifying switch element 142 of the output stage circuit 130 almost have no non-ideal switching loss, and therefore the whole efficiency of the power supply device 100 can be significantly increased.

The following embodiments will introduce the detailed structure and operation of the power supply device 100. It should be understood these figures and descriptions are merely exemplary, rather than limitations of the invention.

Figure 2:
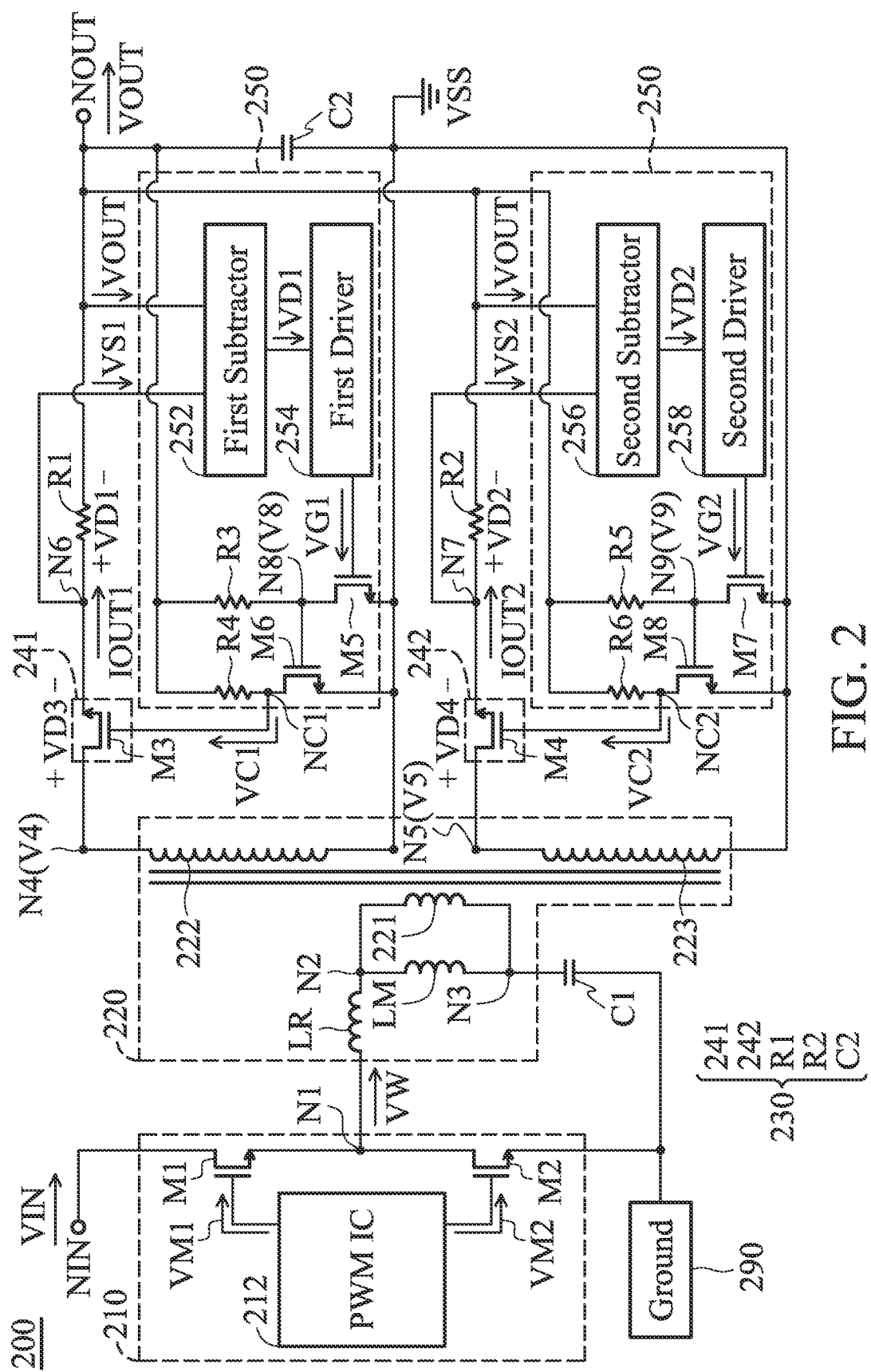
FIG. 2 is a diagram of a power supply device according to an embodiment of the invention.

FIG. 2 is a diagram of a power supply device 200 according to an embodiment of the invention. In the embodiment of FIG. 2, the power supply device 200 with an input node NIN and an output node NOUT includes an input switch circuit 210, a transformer 220, a first capacitor C1, an output stage circuit 230, and a detection and control circuit 250. The input node NIN of the power supply device 200 is arranged for receiving an input voltage VIN from an external input power source. The output node NOUT of the power supply device 200 is arranged for outputting an output voltage VOUT to an electronic device (not shown).

The input switch circuit 210 includes a PWM (Pulse Width Modulation) IC (Integrated Circuit) 212, a first transistor M1, and a second transistor M2. The PWM IC 212 generates a first PWM voltage VM1 and a second PWM voltage VM2. The first PWM voltage VM1 and the second PWM voltage VM2 may be maintained at a constant voltage level when the power supply device 200 is initialized. The first PWM voltage VM1 and the second PWM voltage VM2 may provide periodic clock waveforms when the power supply device 200 is normally operated. In some embodiments, the first PWM voltage VM1 and the second PWM voltage VM2 have the same waveforms; however, there is a phase difference between them, and thus the first PWM voltage VM1 and the second PWM voltage VM2 do not have high logic levels concurrently. Each of the first transistor M1 and the second transistor M2 may be an NMOS transistor (N-type Metal Oxide Semiconductor Field Effect Transistor). The first transistor M1 has a control terminal for receiving the first PWM voltage VM1, a first terminal coupled to a first node N1 for outputting a switching voltage VW, and a second terminal coupled to the input node NIN. The second transistor M2 has a control terminal for receiving the second PWM voltage VM2, a first terminal coupled to a ground 290, and a second terminal coupled to the first node N1. The ground 290 may mean the earth or any grounding path coupled to the earth, and it is not an internal component of the power supply device 200.

The transformer 220 includes a main coil 221, a first secondary coil 222, and a second secondary coil 223. A leakage inductor LR and a magnetizing inductor LM are built in the transformer 220. The leakage inductor LR and the magnetizing inductor LM are inherent elements, which are generated when the transformer 220 is manufactured, and they are not external independent elements. The leakage inductor LR, the main coil 221, and the magnetizing inductor LM may be positioned at the same side of the transformer 220. The first secondary coil 222 and the second secondary coil 223 may be positioned at the opposite side of the transformer 220. The leakage inductor LR has a first terminal coupled to the first node N1 for receiving the switching voltage VW, and a second terminal coupled to a second node N2. The main coil 221 has a first terminal coupled to the second node N2, and a second terminal coupled to a third node N3. The magnetizing inductor LM has a first terminal coupled to the second node N2, and a second terminal coupled to the third node N3. The first capacitor C1 has a first terminal coupled to the third node N3, and a second terminal coupled to the ground 290. In some embodiments, a resonant tank is formed by the leakage inductor LR, the magnetizing inductor LM, and the first capacitor C1, and it is configured to determine the resonant frequency and the corresponding gain of the power supply device 200. The first secondary coil 222 has a first terminal coupled to a fourth node N4, and a second terminal coupled to a ground voltage VSS (e.g., 0V). The second secondary coil 223 has a first terminal coupled to a fifth node N5, and a second terminal coupled to the ground voltage VSS.

The output stage circuit 230 includes a first rectifying switch element 241, a second rectifying switch element 242, a first resistor R1, a second resistor R2, and a second capacitor C2. The first rectifying switch element 241 includes a third transistor M3. The second rectifying switch element 242 includes a fourth transistor M4. Each of the third transistor M3 and the fourth transistor M4 may be an NMOS transistor.

The third transistor M3 has a control terminal coupled to a first control node NC1 for receiving a first control voltage VC1, a first terminal coupled to a sixth node N6 for outputting a first specific voltage VS1, and a second terminal coupled to the fourth node N4. The fourth transistor M4 has a control terminal coupled to a second control node NC2 for receiving a second control voltage VC2, a first terminal coupled to a seventh node N7 for outputting a second specific voltage VS2, and a second terminal coupled to the fifth node N5. The first resistor R1 has a first terminal coupled to the sixth node N6, and a second terminal coupled to the output node NOUT. A first output current IOUT1 can flow through the third transistor M3 and the first resistor R1. The second resistor R2 has a first terminal coupled to the seventh node N7, and a second terminal coupled to the output node NOUT. A second output current IOUT2 can flow through the fourth transistor M4 and the second resistor R2. The second capacitor C2 has a first terminal coupled to the output node NOUT, and a second terminal coupled to the ground voltage VSS.

The detection and control circuit 250 includes a first subtractor 252, a first driver 254, a second subtractor 256, a second driver 258, a fifth transistor M5, a sixth transistor M6, a seventh transistor M7, an eighth transistor M8, a third resistor R3, a fourth resistor R4, a fifth resistor R5, and a sixth resistor R6. Each of the fifth transistor M5, the sixth transistor M6, the seventh transistor M7, and the eighth transistor M8 may be an NMOS transistor.

The first subtractor 252 can subtract the output voltage VOUT from the first specific voltage VS1 at the sixth node N6, so as to generate a first voltage difference VD1. According to the Ohm's Law, the first voltage difference VD1 is equal to the product of the first output current IOUT1's current magnitude and the first resistor R1's resistance. Next, the first driver 254 can amplify the first voltage difference VD1, so as to generate a first driving voltage VG1. The operations of the first subtractor 252 and the first driver 254 can be described according to the following equations (1), (2) and (3).

$$VD1 = VS1 - VOUT. \quad (1)$$

$$VD1 = IOUT1 \cdot R1 \quad (2)$$

$$VG1 = VD1 \cdot K1 \quad (3)$$

where "VD1" represents the first voltage difference VD1, "VS1" represents the first specific voltage VS1, "VOUT" represents the output voltage VOUT, "IOUT1" represents the current magnitude of the first output current IOUT1, "R1" represents the resistance of the first resistor R1, "VG1" represents the first driving voltage VG1, and "K1" represents the amplifying gain of the first driver 254 (which may be any positive value).

The fifth transistor M5 has a control terminal for receiving the first driving voltage VG1, a first terminal coupled to the ground voltage VSS, and a second terminal coupled to an eighth node N8. The third resistor R3 has a first terminal coupled to the output node NOUT, and a second terminal coupled to the eighth node N8. The sixth transistor M6 has a control terminal coupled to the eighth node N8, a first terminal coupled to the ground voltage VSS, and a second terminal coupled to the first control node NC1 for outputting the first control voltage VC1. The fourth resistor R4 has a first terminal coupled to the output node NOUT, and a second terminal coupled to the first control node NC1.

The second subtractor 256 can subtract the output voltage VOUT from the second specific voltage VS2 at the seventh node N7, so as to generate a second voltage difference VD2. According to the Ohm's Law, the second voltage difference VD2 is equal to the product of the second output current IOUT2's current magnitude and the second resistor R2's resistance. Next, the second driver 258 can amplify the second voltage difference VD2, so as to generate a second driving voltage VG2. The operations of the second subtractor 256 and the second driver 258 can be described according to the following equations (4), (5) and (6).

$$VD2 = VS2 - VOUT. \quad (4)$$

$$VD2 = IOUT2 \cdot R2 \quad (5)$$

$$VG2 = VD2 \cdot K2 \quad (6)$$

where "VD2" represents the second voltage difference VD2, "VS2" represents the second specific voltage VS2, "VOUT" represents the output voltage VOUT, "IOUT2" represents the current magnitude of the second output current IOUT2, "R2" represents the resistance of the second resistor R2, "VG2" represents the second driving voltage VG2, and "K2" represents the amplifying gain of the second driver 258 (which may be any positive value).

The seventh transistor M7 has a control terminal for receiving the second driving voltage VG2, a first terminal coupled to the ground voltage VSS, and a second terminal coupled to a ninth node N9. The fifth resistor R5 has a first terminal coupled to the output node NOUT, and a second terminal coupled to the ninth node N9. The eighth transistor M8 has a control terminal coupled to the ninth node N9, a first terminal coupled to the ground voltage VSS, and a second terminal coupled to the second control node NC2 for outputting the second control voltage VC2. The sixth resistor R6 has a first terminal coupled to the output node NOUT, and a second terminal coupled to the second control node NC2.

In some embodiments, the power supply device 200 can operate in a first mode and a second mode alternately, and its operation principles will be described as follows.

In the first mode, the first PWM voltage VM1 has a high logic level for enabling the first transistor M1, and the second PWM voltage VM2 has a low logic level for disabling the second transistor M2. In response to the change in the first output current IOUT1, the first rectifying switch element 241 of the output stage circuit 250 can perform different operations. When the first output current IOUT1 is not equal to 0, the first voltage difference VD1 of the first subtractor 252 is a positive value, and the first driving voltage VG1 of the first driver 254 has a high logic level for enabling the fifth transistor M5. At this time, the voltage V8 at the eighth node N8 is almost pulled down to the ground voltage VSS, and thus the sixth transistor M6 is disabled. Since the sixth transistor M6 is disabled, the first control voltage VC1 at the first control node NC1 is indirectly pulled up by the output voltage VOUT, so as to enable the third transistor M3 (i.e., the first rectifying switch element 241 is closed).

In the first mode, when the first output current IOUT1 is exactly equal to 0, the first voltage difference VD1 of the first subtractor 252 is also equal to 0, and the first driving voltage VG1 of the first driver 254 has a low logic level for disabling the fifth transistor M5. Since the fifth transistor M5 is disabled, the voltage V8 at the eighth node N8 is indirectly pulled up by the output voltage VOUT, so as to enable the sixth transistor M6. At this time, the first control voltage VC1 at the first control node NC1 is almost pulled down to the ground voltage VSS, and thus the third transistor M3 is disabled (i.e., the first rectifying switch element 241 is opened). It should be noted that in the first mode, the second secondary coil 223, the fourth transistor M4, the second subtractor 256, and the second driver 258 are all disabled.

In the second mode, the first PWM voltage VM1 has a low logic level for disabling the first transistor M1, and the second PWM voltage VM2 has a high logic level for enabling the second transistor M2. In response to the change in the second output current IOUT2, the second rectifying switch element 242 of the output stage circuit 250 can perform different operations. When the second output current IOUT2 is not equal to 0, the second voltage difference VD2 of the second subtractor 256 is a positive value, and the second driving voltage VG2 of the second driver 258 has a high logic level for enabling the seventh transistor M7. At this time, the voltage V9 at the ninth node N9 is almost pulled down to the ground voltage VSS, and thus the eighth transistor M8 is disabled. Since the eighth transistor M8 is disabled, the second control voltage VC2 at the second control node NC2 is indirectly pulled up by the output voltage VOUT, so as to enable the fourth transistor M4 (i.e., the second rectifying switch element 242 is closed).

In the second mode, when the second output current IOUT2 is exactly equal to 0, the second voltage difference VD2 of the second subtractor 256 is also equal to 0, and the second driving voltage VG2 of the second driver 258 has a low logic level for disabling the seventh transistor M7. Since the seventh transistor M7 is disabled, the voltage V9 at the ninth node N9 is indirectly pulled up by the output voltage VOUT, so as to enable the eighth transistor M8. At this time, the second control voltage VC2 at the second control node NC2 is almost pulled down to the ground voltage VSS, and thus the fourth transistor M4 is disabled (i.e., the second rectifying switch element 242 is opened). It should be noted that in the second mode, the first secondary coil 222, the third transistor M3, the first subtractor 252, and the first driver 254 are all disabled.

Figure 3:
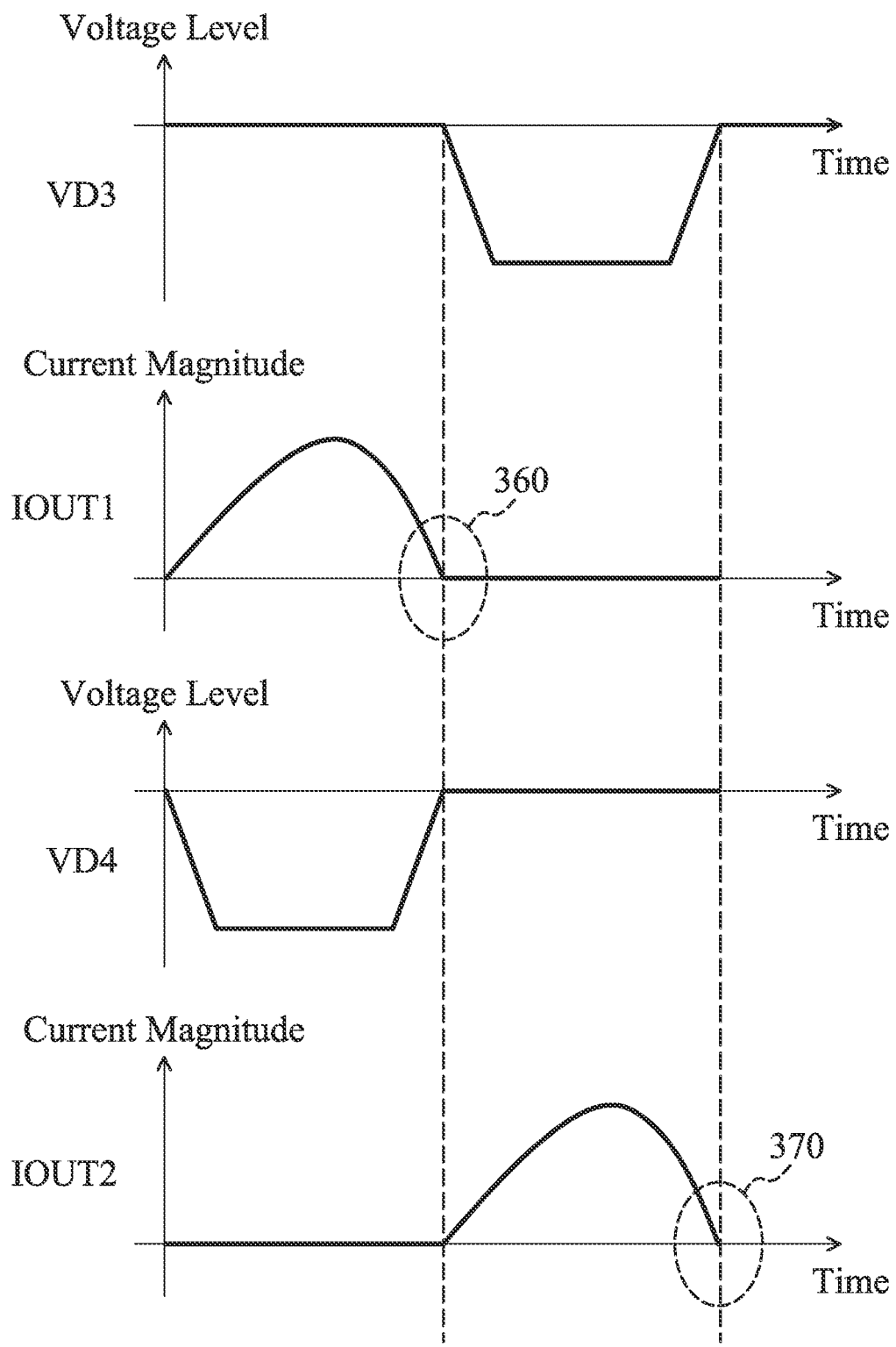
FIG. 3 is a diagram of signal waveforms of a power supply device according to an embodiment of the invention.

FIG. 3 is a diagram of signal waveforms of the power supply device 200 according to an embodiment of the invention. The horizontal axis represents time. The vertical axis represents voltage level or current magnitude. A third voltage difference VD3 is formed between the second terminal and the first terminal of the third transistor M3, and it may be equal to the fourth node N4's voltage V4 minus the first specific voltage VS1 at the sixth node N6. In addition, a fourth voltage difference VD4 is formed between the second terminal and the first terminal of the fourth transistor M4, and it may be equal to the fifth node N5's voltage V5 minus the second specific voltage VS2 at the seventh node N7. According to the measurement of FIG. 3, when the third transistor M3 is switched from the enable state into the disable state, the first output current IOUT1 flowing through the third transistor M3 can be exactly reduced to 0 (as indicated by a first dashed box 360). In addition, when the fourth transistor M4 is switched from the enable state into the disable state, the second output current IOUT2 flowing through the fourth transistor M4 can be exactly reduced to 0 (as indicated by a second dashed box 370). In other words, with the design of the invention, the first rectifying switch element 241 and the second rectifying switch element 242 of the output stage circuit 250 almost have no non-ideal switching loss, and therefore the whole efficiency of the power supply device 200 can be significantly increased.

In some embodiments, the element parameters of the power supply device 200 are as follows. The capacitance of the first capacitor C1 may be from 42.3 nF to 51.7 nF, such as about 47 nF. The capacitance of the second capacitor C2 may be from 376 µF to 564 µF, such as about 470 µF. The inductance of the leakage inductor LR may be from 27 µH to 33 µH, such as about 30 µH. The inductance of the magnetizing inductor LM may be from 252 µH to 308 µH, such as about 280 µH. The resistance of the first resistor R1 may be from 19.8 mΩ to 20.2 mΩ, such as about 20 mΩ. The resistance of the second resistor R2 may be from 19.8 mΩ to 20.2 mΩ, such as about 20 mΩ. The resistance of the third resistor R3 may be from 9 KΩ to 11 KΩ, such as about 10 KΩ. The resistance of the fourth resistor R4 may be from 9Ω to 11Ω, such as about 10Ω. The resistance of the fifth resistor R5 may be from 9 KΩ to 11 KΩ, such as about 10 KΩ. The resistance of the sixth resistor R6 may be from 9Ω to 11Ω, such as about 10Ω. The turn ratio of the main coil 221 to the first secondary coil 222 may be from 1 to 100, such as about 20. The turn ratio of the main coil 221 to the second secondary coil 223 may be from 1 to 100, such as about 20. The above ranges of parameters are calculated and obtained according to the results of many experiments, and they help to minimize the switching loss of the power supply device 200.

The invention proposes a novel power supply device, which includes low-loss rectifying switch elements. According to practical measurements, the power supply device using the aforementioned design can significantly increase the whole efficiency, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-3. The invention may merely include any one or more features of any one or more embodiments of FIGS. 1-3. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device with low loss, comprising:
   an input switch circuit, generating a switching voltage according to an input voltage;
   a transformer, comprising a main coil, a first secondary coil, and a second secondary coil, wherein a leakage inductor and a magnetizing inductor are built in the transformer, and the main coil receives the switching voltage through the leakage inductor;
   a first capacitor, wherein the magnetizing inductor is coupled through the first capacitor to a ground;
   an output stage circuit, coupled to the first secondary coil and the second secondary coil, and generating an output voltage, wherein the output stage circuit comprises a first rectifying switch element and a second rectifying switch element; and
   a detection and control circuit, coupled to the output stage circuit, wherein the detection and control circuit detects a first output current flowing through the first rectifying switch element so as to generate a first control voltage, and detects a second output current flowing through the second rectifying switch element so as to generate a second control voltage;
   wherein the first rectifying switch element is selectively closed or opened according to the first control voltage;
   wherein the second rectifying switch element is selectively closed or opened according to the second control voltage, and
   wherein the detection and control circuit comprises:
   a first subtractor, subtracting the output voltage from a first specific voltage at a sixth node, so as to generate a first voltage difference;

a first driver, amplifying the first voltage difference, so as to generate a first driving voltage;
a fifth transistor, wherein the fifth transistor has a control terminal for receiving the first driving voltage, a first terminal coupled to a ground voltage, and a second terminal coupled to an eighth node;
a third resistor, wherein the third resistor has a first terminal coupled to an output node, and a second terminal coupled to the eighth node;
a sixth transistor, wherein the sixth transistor has a control terminal coupled to the eighth node, a first terminal coupled to the ground voltage, and a second terminal coupled to a first control node for outputting the first control voltage; and
a fourth resistor, wherein the fourth resistor has a first terminal coupled to the output node, and a second terminal coupled to the first control node.

2. The power supply device as claimed in claim 1, wherein when the first output current is exactly equal to 0, the first rectifying switch element is opened, and when the second output current is exactly equal to 0, the second rectifying switch element is opened.

3. The power supply device as claimed in claim 1, wherein the input switch circuit comprises:
a PWM (Pulse Width Modulation) IC (Integrated Circuit), generating a first PWM voltage and a second PWM voltage;
a first transistor, wherein the first transistor has a control terminal for receiving the first PWM voltage, a first terminal coupled to a first node for outputting the switching voltage, and a second terminal coupled to an input node for receiving the input voltage; and
a second transistor, wherein the second transistor has a control terminal for receiving the second PWM voltage, a first terminal coupled to the ground, and a second terminal coupled to the first node.

4. The power supply device as claimed in claim 3, wherein the leakage inductor has a first terminal coupled to the first node for receiving the switching voltage, and a second terminal coupled to a second node, wherein the main coil has a first terminal coupled to the second node, and a second terminal coupled to a third node, and wherein the magnetizing inductor has a first terminal coupled to the second node, and a second terminal coupled to the third node.

5. The power supply device as claimed in claim 4, wherein the first capacitor has a first terminal coupled to the third node, and a second terminal coupled to the ground.

6. The power supply device as claimed in claim 5, wherein the first secondary coil has a first terminal coupled to a fourth node, and a second terminal coupled to the ground voltage, and wherein the second secondary coil has a first terminal coupled to a fifth node, and a second terminal coupled to the ground voltage.

7. The power supply device as claimed in claim 6, wherein the first rectifying switch element comprises a third transistor which has a control terminal coupled to the first control node for receiving the first control voltage, a first terminal coupled to the sixth node, and a second terminal coupled to the fourth node.

8. The power supply device as claimed in claim 7, wherein the second rectifying switch element comprises a fourth transistor which has a control terminal coupled to a second control node for receiving the second control voltage, a first terminal coupled to a seventh node, and a second terminal coupled to the fifth node.

9. The power supply device as claimed in claim 8, wherein the output stage circuit further comprises:
a first resistor, wherein the first resistor has a first terminal coupled to the sixth node, and a second terminal coupled to the output node for outputting the output voltage;
a second resistor, wherein the second resistor has a first terminal coupled to the seventh node, and a second terminal coupled to the output node; and
a second capacitor, wherein the second capacitor has a first terminal coupled to the output node, and a second terminal coupled to the ground voltage.

10. The power supply device as claimed in claim 1, wherein the detection and control circuit further comprises:
a second subtractor, subtracting the output voltage from a second specific voltage at a seventh node, so as to generate a second voltage difference; and
a second driver, amplifying the second voltage difference, so as to generate a second driving voltage.

11. The power supply device as claimed in claim 10, wherein the detection and control circuit further comprises:
a seventh transistor, wherein the seventh transistor has a control terminal for receiving the second driving voltage, a first terminal coupled to the ground voltage, and a second terminal coupled to a ninth node; and
a fifth resistor, wherein the fifth resistor has a first terminal coupled to the output node, and a second terminal coupled to the ninth node.

12. A power supply device with low loss, comprising:
an input switch circuit, generating a switching voltage according to an input voltage;
a transformer, comprising a main coil, a first secondary coil, and a second secondary coil, wherein a leakage inductor and a magnetizing inductor are built in the transformer, and the main coil receives the switching voltage through the leakage inductor;
a first capacitor, wherein the magnetizing inductor is coupled through the first capacitor to a ground;
an output stage circuit, coupled to the first secondary coil and the second secondary coil, and generating an output voltage, wherein the output stage circuit comprises a first rectifying switch element and a second rectifying switch element; and
a detection and control circuit, coupled to the output stage circuit, wherein the detection and control circuit detects a first output current flowing through the first rectifying switch element so as to generate a first control voltage, and detects a second output current flowing through the second rectifying switch element so as to generate a second control voltage;
wherein the first rectifying switch element is selectively closed or opened according to the first control voltage;
wherein the second rectifying switch element is selectively closed or opened according to the second control voltage; and
wherein the detection and control circuit further comprises:
a second subtractor, subtracting the output voltage from a second specific voltage at a seventh node, so as to generate a second voltage difference;
a second driver, amplifying the second voltage difference, so as to generate a second driving voltage;
a seventh transistor, wherein the seventh transistor has a control terminal for receiving the second driving voltage, a first terminal coupled to a ground voltage, and a second terminal coupled to a ninth node;

a fifth resistor, wherein the fifth resistor has a first terminal coupled to an output node, and a second terminal coupled to the ninth node;

an eighth transistor, wherein the eighth transistor has a control terminal coupled to the ninth node, a first terminal coupled to the ground voltage, and a second terminal coupled to a second control node for outputting the second control voltage; and a sixth resistor, wherein the sixth resistor has a first terminal coupled to the output node, and a second terminal coupled to the second control node.

13. A power supply device with low loss, comprising:

an input switch circuit, generating a switching voltage according to an input voltage;

a transformer, comprising a main coil, a first secondary coil, and a second secondary coil, wherein a leakage inductor and a magnetizing inductor are built in the transformer, and the main coil receives the switching voltage through the leakage inductor;

a first capacitor, wherein the magnetizing inductor is coupled through the first capacitor to a ground;

an output stage circuit, coupled to the first secondary coil and the second secondary coil, and generating an output voltage, wherein the output stage circuit comprises a first rectifying switch element and a second rectifying switch element; and a detection and control circuit, coupled to the output stage circuit, wherein the detection and control circuit detects a first output current flowing through the first rectifying switch element so as to generate a first control voltage, and detects a second output current flowing through the second rectifying switch element so as to generate a second control voltage;

wherein the first rectifying switch element is selectively closed or opened according to the first control voltage;

wherein the second rectifying switch element is selectively closed or opened according to the second control voltage;

wherein when the first output current is exactly equal to 0, the first rectifying switch element is opened, and when the second output current is exactly equal to 0, the second rectifying switch element is opened; and wherein the detection and control circuit comprises:

a first subtractor, subtracting the output voltage from a first specific voltage at a sixth node, so as to generate a first voltage difference;

a first driver, amplifying the first voltage difference, so as to generate a first driving voltage;

a fifth transistor, wherein the fifth transistor has a control terminal for receiving the first driving voltage, a first terminal coupled to a ground voltage, and a second terminal coupled to an eighth node; and a third resistor, wherein the third resistor has a first terminal coupled to an output node, and a second terminal coupled to the eighth node.

* * * * *